United States Patent [19]

Ku

[11] Patent Number: 5,575,001
[45] Date of Patent: Nov. 12, 1996

[54] DIRECT BROADCASTING SATELLITE TUNER WITH A NEGATIVE FEEDBACK AND IMAGE COMPRESSION CIRCUIT

[75] Inventor: Hsi-Yung Ku, Taipei, Taiwan

[73] Assignee: Hwa Lin Electronic Co., Ltd., Taipei, Taiwan

[21] Appl. No.: 483,161

[22] Filed: Jun. 7, 1995

[51] Int. Cl.$^6$ .................................................. H04B 1/18
[52] U.S. Cl. ............................................................ 455/192.1
[58] Field of Search ........................... 455/192.1, 192.2, 455/193.3, 285, 302, 182.1, 182.2, 316, 245.1, 245.2, 255, 262, 260, 263, 264, 258

[56] References Cited

U.S. PATENT DOCUMENTS

| | | | |
|---|---|---|---|
| 3,626,301 | 12/1971 | Develet | 455/264 |
| 3,936,753 | 2/1976 | Clark | 455/302 |
| 3,942,120 | 3/1976 | Ham | 455/302 |
| 4,115,737 | 9/1978 | Honger et al. | 455/285 |
| 4,263,676 | 4/1981 | Liebel | 455/285 |
| 4,556,988 | 12/1985 | Yoshisato | 455/182.2 |
| 5,404,587 | 4/1995 | Okanobu | 455/182.2 |

FOREIGN PATENT DOCUMENTS 002423  1/1989  Japan.

*Primary Examiner*—Reinhard J. Eisenzopf
*Assistant Examiner*—Lee Nguyen
*Attorney, Agent, or Firm*—Bacon & Thomas

[57] ABSTRACT

A dual-input DBS (direct broadcasting satellite) tuner having a negative feedback & image compression circuit. Radio frequency input signal (950 MHZ–2050 MHZ) is amplified and converted into an intermediate frequency signal through low-pass filters, a radio frequency converter, a tracking filter, an attenuation circuit, and a microwave monolithic integrated circuit, and then demodulated by a second stage amplifier, a SAW filter and a negative feedback & image compression circuit, so as to eliminate noises, increase sound/noise ratio, and improve the threshold when the compressed image intermediate frequency signal enters the demodulator circuit, enabling the tuner to automatically match with the specification of the outdoor antenna subject to the change of weather.

6 Claims, 3 Drawing Sheets

# 5,575,001

DIRECT BROADCASTING SATELLITE TUNER WITH A NEGATIVE FEEDBACK AND IMAGE COMPRESSION CIRCUIT

BACKGROUND OF THE INVENTION (a) Field of the Invention

The present invention relates to tuners, and relates more particularly to a direct broadcasting satellite broad-band tuner with a negative feedback & image compression circuit in which the baseband frequency signal from a demodulator circuit is amplified by a baseband amplifier circuit, then fed back to a variable capacitance diode through a phase correction circuit, which corrects the deviated phase, permitting the DC level of the capacitance diode to be regulated by means of the control of 12 V power supply, then fed back to the voltage control oscillator (VCO) of a microwave monolithic integrated circuit for mixing with the frequency of the radio frequency so that the modulated intermediate frequency signal can be compressed and the compressed image intermediate frequency signal can effectively eliminate noises, increase sound/noise ratio, and improve the threshold when entering said demodulator circuit.

(b) Description of the Prior Art

During the transmission of direct broadcasting satellite, audio and video (baseband frequency) signals are properly arranged at the ground transmitting station through a multiplexer, then modulated to an intermediate frequency signal and then amplified and turned into a radio signal for transmitting through a transmitting antenna. The ground receiving station has a low-noise broad-band radio frequency receiver to receive radio signals. Upon receipt of a radio signal, the signal is amplified and turned into an intermediate frequency signal, and then the intermediate frequency signal is further demodulated by a demodulator circuit to a baseband frequency signal containing a video signal and an audio signal. When the ground receiving station receives a useful electromagnetic wave signal from the atmosphere, interference waves and noises from the atmosphere may interfere with the receiving of the signal or pass into the signal, causing the reliability of the communication affected.

Furthermore, in regular broadband satellite receiving tuners with demodulator means, the intermediate frequency bandwidth is already set, and an IF band pass filter shall be used if to change the bandwidth of the frequency. However, using an IF band pass filter to adjust the bandwidth of the frequency tends to cause a receiving signal loss and image distortion, furthermore it gives little improvement on threshold.

SUMMARY OF THE INVENTION

The present invention has been accomplished to provide a direct broadcasting satellite tuner with a negative feedback & image compression circuit which eliminates the aforesaid drawbacks.

It is one object of the present invention to provide a DBS (direct broadcasting satellite) tuner having a negative feedback & image compression circuit, in which the baseband frequency signal outputted from the demodulator circuit is amplified by a baseband amplifier circuit, then fed back to a variable capacitance diode through a phase correction circuit, permitting the variable capacitance diode to be controlled by 12 V power supply, and then fed back to the voltage control oscillator of the microwave monolithic inaugurated circuit for mixing with the frequency of the radio frequency so that the modulated intermediate frequency signal can be compressed and the compressed image intermediate frequency signal can effectively eliminate noises, increase sound/noise ratio, and improve the threshold when entering said demodulator circuit.

It is another object of the present invention to provide a DBS tuner having a negative feedback & image compression circuit which is simple in structure, and can be set subject to different satellite transmission band widths to maintain the quality of the image.

BRIEF DESCRIPTION OF THE DRAWINGS

The present invention will now be described by way of example with reference to the annexed drawings, in which:

FIG. 4 is a circuit diagram of the baseband amplifier circuit, phase correction circuit, and related connecting elements of the negative feedback & image compression circuit according to the present invention.

DETAILED DESCRIPTION OF THE PREFERRED EMBODIMENT

Figure 1:
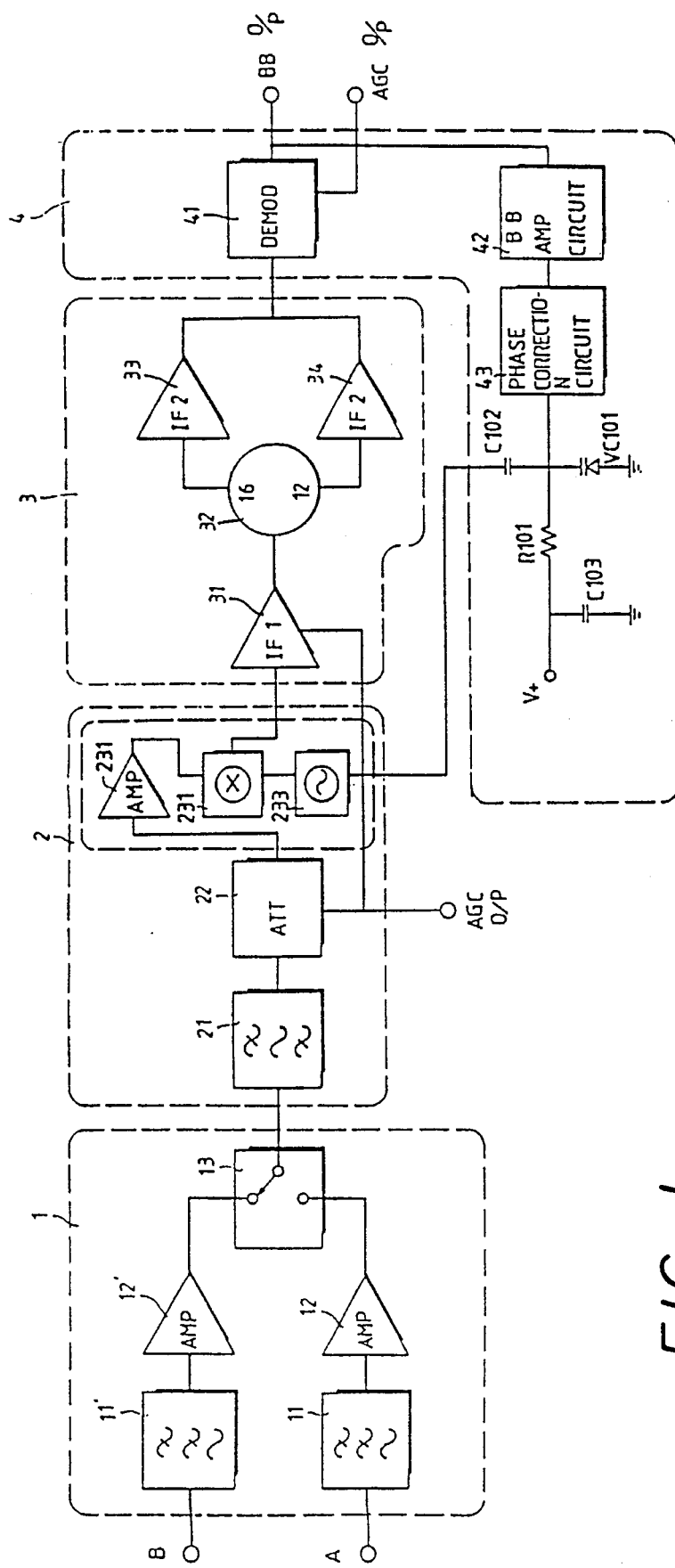
FIG. 1 is a circuit block diagram according to the present invention.

Referring to FIG. 1, a direct broadcasting satellite tuner with a negative feedback & image compression circuit in accordance with the present invention is generally comprised of radio frequency input device 1, frequency converter 2, intermediate frequency amplifier unit 3, and negative feedback & image compression circuit 4.

Figure 2:
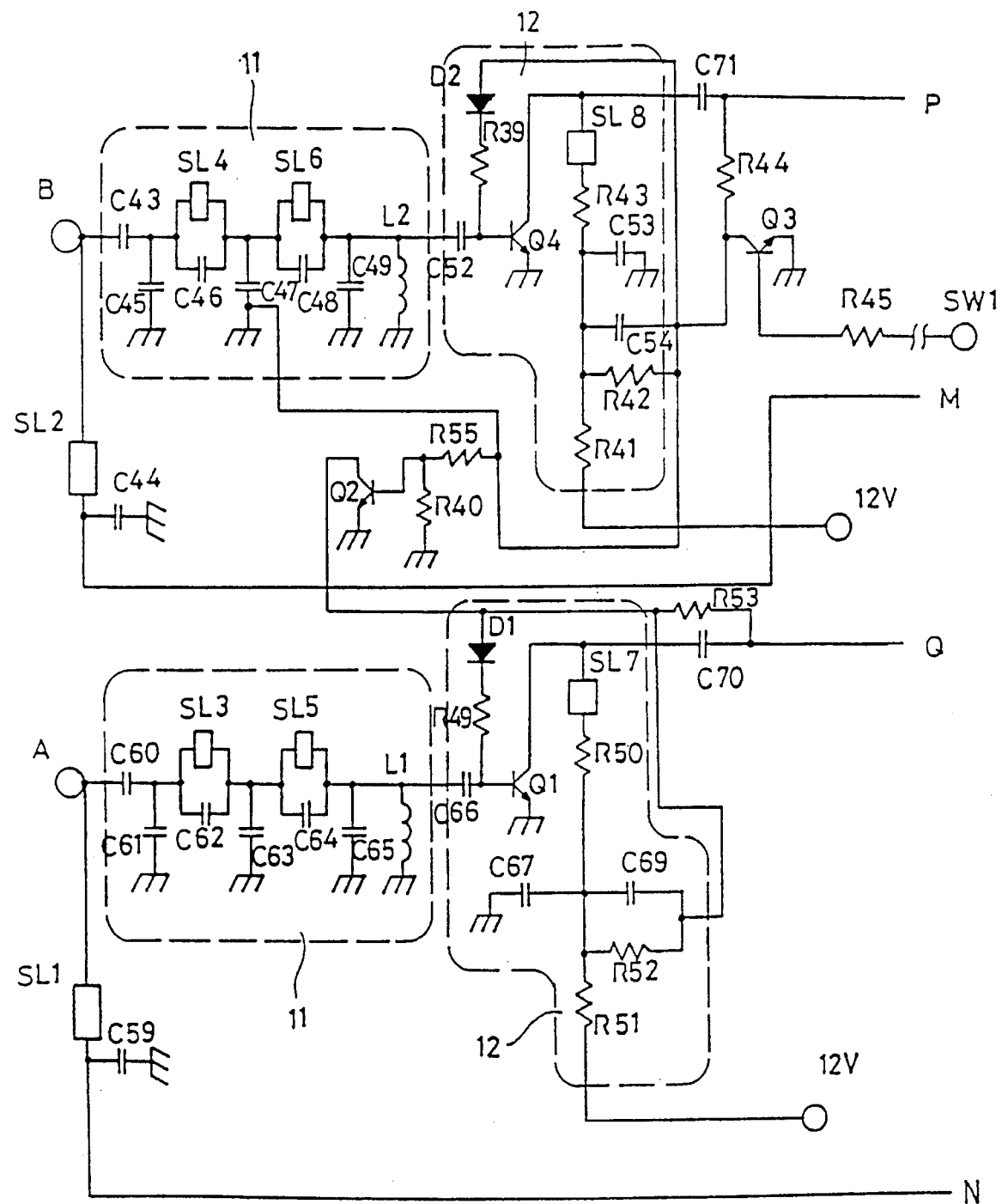
FIG. 2 is a circuit diagram of the radio frequency input device according to the present invention.
Figure 3:
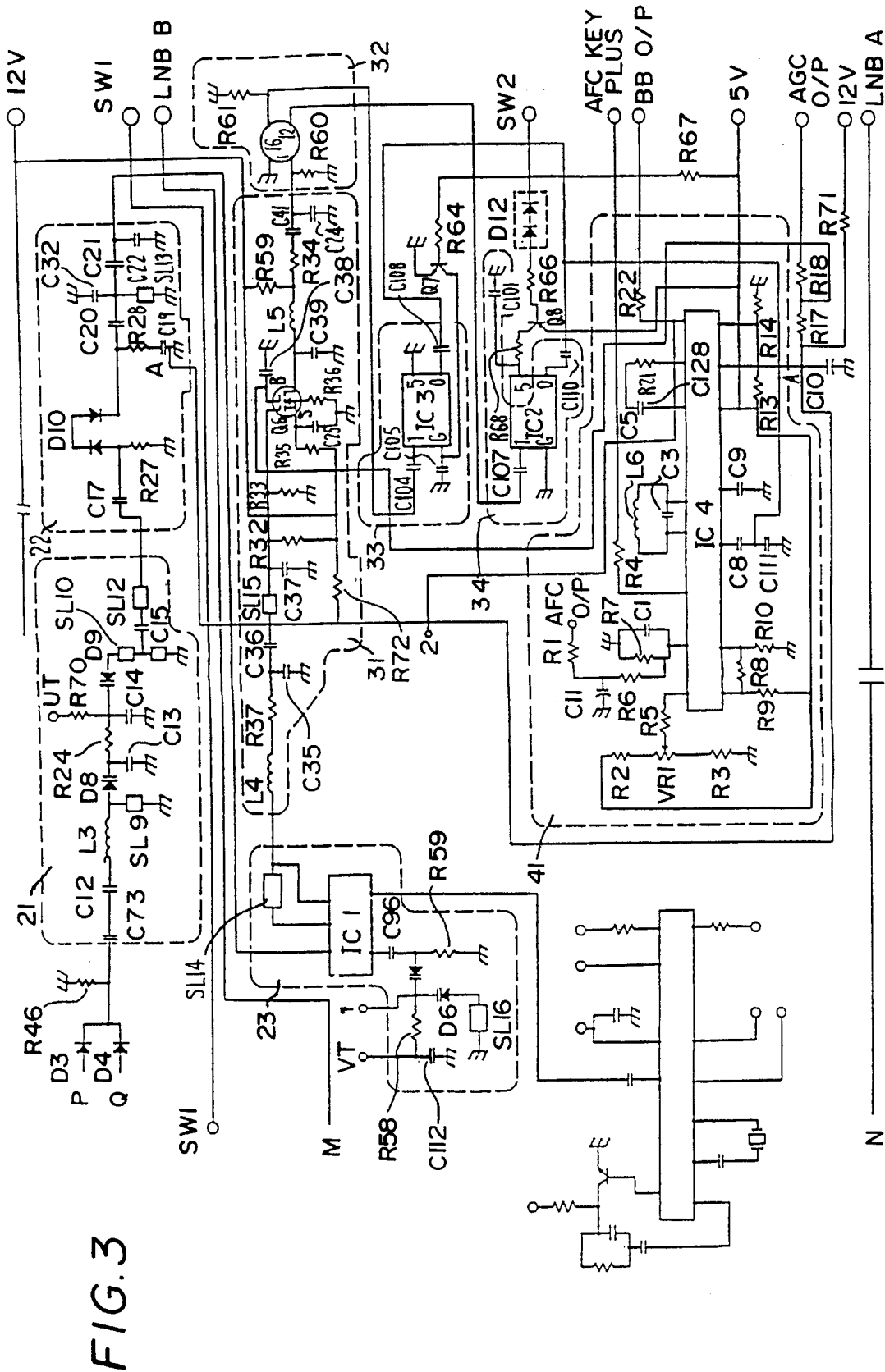
FIG. 3 is a circuit diagram of the frequency converter, intermediate frequency amplifier unit, and negative feedback & image compression circuit according to the present invention.

Referring to FIGS. 2 and 3, and FIG. 1 again, radio frequency input device 1 is comprised of low-pass filters 11 and 11', radio frequency amplifiers 12 and 12', and switching circuit 13. The input terminals of radio frequency amplifiers 12 and 12' are respectively connected to output terminals of low-pass filters 11 and 11', and the output terminals thereof are respectively connected to a respective input end at switching circuit 13. The output end of switching circuit 13 is connected to frequency converter 2.

The radio frequency signal (950 MHz–2050 MHz) from the satellite antenna is received by low-pass filters 11 and 11' through terminal A or B by means of the control of switching circuit 13. Switching circuit 13 is comprised of A/B terminal option switch SW1, transistors Q2 and Q3, diodes D3 and D4, resistors R44, R53 and R45, and capacitors C70 and C71. When A/B terminal option switch SW1 of switching circuit 13 is at high potential, transistor Q2 and diode D4 are electrically connected, transistor Q3 and diode D3 are electrically disconnected, and therefore low pass filter 11 receives the radio frequency signal (950–2050 MHZ) and eliminates frequency over 2050 MHz to let impedance be matched. Low pass filter 11 consists of capacitors C60, C61, C62, C63, C64 and C65, inductor L1 and microstrip line circuit SL3 and SL5. The output signal from low pass filter 11 is then sent to radio frequency amplifier 12 for amplification. Radio frequency amplifier 12 consists of coupling capacitor C66 transistor Q1, diode D1, bias resistors R49, R50 and R51, ground capacitor C67, decoupling circuit R52 and C69, and microstrip line circuit SL7. The amplified signal from radio frequency amplifier 12 is then sent to frequency converter 2 through capacitor C70 and diode D4. Decoupling circuit R52 and C69 of radio frequency amplifier 12 prohibits high-frequency signal from passing through resistor R53 to diode D4.

Similarly, when A/B terminal option switch SW1 of switching circuit 13 is at low potential, transistor Q3 and diode D3 are electrically connected, transistor Q2 and diode D4 are electrically disconnected, and therefore radio signal is inputted into radio frequency input device 1 through terminal B and then sent to low pass filter 11', which consists of capacitors C43, C45, C46, C47, C48 and C49, inductor L12 and microstrip line circuit SL4 and SL6, permitting frequency over 2050 MHz to be removed and impedance matched. The output signal from low pass filter 11' is then sent to radio frequency amplifier 12' for amplification, which radio frequency amplifier 12' consists of coupling capacitor C52, transistor Q4, diode D2, bias resistors R39, R41 and R43, ground capacitor C53, decoupling circuit R42 and C54, and microstrip line circuit SL8.

The amplified output signal from radio amplifier 12' is then sent to frequency converter 2 through capacitor C71 and diode D3. Decoupling circuit R42 and C54 of radio frequency amplifier 12' prohibits high-frequency signal from passing through resistor R44 to diode D3.

Frequency converter 2 consists of tracking filter 21, attenuation circuit 22, and microwave monolithic integrated circuit (MMIC) 23. The input terminal of tracking filter 21 is connected to the output terminal of radio frequency input device 1, and its output terminal is connected to the input terminal of attenuation circuit 22. The output terminal of attenuation circuit 22 is connected to the input terminal of microwave monolithic integrated circuit 23. The output terminal of microwave monolithic integrated circuit 23 is connected to intermediate frequency amplifier unit 3. The internal circuit of attenuation circuit 22 is connected with automatic gain control (AGC). Tracking filter 21 which consists of inductor L3, resistors R24 and R70, capacitors C12, C13, C14, C15 and C73, variable capacitance diodes D8 and D9, and microstrip line circuit SL9, SL10, SL11 and SL12, receives the output signal from radio frequency input device 1 and removes image frequency from the signal. The output signal from tracking filter 21 is then sent to attenuation circuit 22, which consists of coupling capacitor C17, diode D10, resistors R27 and R28, capacitors C19, C22 and C32, and matching circuit C20, C21 and SL13. Matching circuit C20, C21 and SL13 is to constrain low frequency signal from gaining. Attenuation circuit 22 attenuates the output signal from tracking filter 21 so as to eliminate interference of noises during high intensity of signal. By means of the control of automatic gain control 5, attenuation circuit 22 controls the gaining or reducing of the signal passing through. The attenuated signal from attenuation circuit 22 is then sent to microwave monolithic integrated circuit 23, which is composed of radio frequency amplifier 231, frequency mixer 232, and voltage control oscillator 233, for amplification. Microwave monolithic integrated circuit 23 comprises integrated circuit IC1, resistors R58 and R59, capacitors C81, C96 and C112, microstrip circuits SL16 and SL14, variable capacitance diodes D6 and D7. Microstrip circuit SL16 is connected to capacitance diode D6. The opposite end of capacitance diode D6 is connected to capacitance diode D7, and connected through resistor R58 to power supply VT to control the oscillating frequency of voltage control oscillator 233. The opposite end of capacitance diode D7 is connected to resistor R59, and connected to IC1 through capacitor C96. The output terminal of IC1 is connected to intermediate frequency amplifier unit 3. Microwave monolithic integrated circuit 23 receives the output signal from attenuation circuit 22 and processes the signal into an intermediate frequency signal by superheterodyne by means of the operation of radio frequency amplifier 231, voltage control oscillator 232 and frequency mixer 233, for output to intermediate frequency amplifier unit 3 for amplification.

Intermediate frequency amplifier unit 3 consists of first stage intermediate frequency amplifier 31, SAW filter 32, and second stage intermediate frequency amplifiers 33 and 34. The input terminal of first stage intermediate frequency amplifier 31 is connected to the output terminal of frequency converter 2. The output terminal of first stage intermediate frequency amplifier 31 is connected to the input terminal of SAW filter 32. The output terminal of SAW filter 32 is connected to the input terminals of second stage intermediate frequency amplifiers 33 and 34. The output terminals of second stage intermediate frequency amplifiers 33 and 34 are connected to the input terminal of negative feedback & image compression circuit 4. The internal circuit of first stage intermediate frequency amplifier 31 is connected with automatic gain control (AGC). First stage intermediate frequency amplifier 31 consists of MOSFET, bias resistors R32, R33, R34, R35, R36 and R69, ground capacitors C25 and C38, and matching circuit consisting of inductor L4, resistor R37, capacitors C24, C35, C36, and C41. First stage intermediate frequency amplifier 31 receives the intermediate frequency output signal from frequency converter 2 and then amplifies the signal, and also controls the gaining or reducing of the signal passing through by means of the operation of automatic gain control circuit. The output signal from first stage intermediate frequency amplifier 31 is then sent to SAW filter 32.

SAW filter 32 filtrates the signal of frequency bandwidth of 16 MHz or 12 MHZ and then sends the filtrated signal to second stage intermediate frequency amplifier 33, which consists of integrated circuit IC3, ground capacitor C105, and coupling capacitors C104 and C108, or to second stage intermediate frequency amplifier 34, which consists of integrated circuit IC2, ground capacitor C101, and coupling capacitors C107 and C110. Second stage intermediate frequency amplifier 33 is connected to 16/12 MHz selector switch SW2 through transistor Q7 and resistor R64. Second stage intermediate frequency amplifier 34 is connected to 16/12 MHz selector switch SW2 through transistor Q8 and diode D12.

When 16/12 MHz selector switch SW2 is switched to "HIGH", transistor Q7 is turned on, transistor Q8 and diode D12 are turned off, therefore intermediate frequency signal of bandwidth 16 MHz is provided and sent to second stage intermediate frequency amplifier 33 for amplification and, the amplified signal from second stage intermediate frequency amplifier 33 is then sent to negative feedback & image compression circuit 4.

Similarly, when 16/27 MHz selector switch SW2 is switched to "LOW", transistor Q8 and diode D12 are turned on, transistor Q7 is turned off, therefore intermediate frequency signal of bandwidth 12 MHz is provided and sent to second stage intermediate frequency amplifier 34 for amplification and, the amplified signal from second stage intermediate frequency amplifier 34 is then sent to negative feedback & image compression circuit 4.

Negative feedback & image compression circuit 4 is comprised of demodulator circuit 41, baseband amplifier circuit 42, phase correction circuit 43, variable capacitance diode VC101, and power supply V+ (in the present preferred embodiment, power supply V+ is 12 V). The input terminal of demodulator circuit 41 is connected to the output terminal of intermediate frequency amplifier unit 3, and the output terminal thereof is connected to the input terminal of baseband amplifier circuit 42. The output terminal of baseband amplifier circuit 42 is connected to the input terminal of phase correction circuit 43. The output terminal of phase correction circuit 43 is connected to variable capacitance diode VC101, which is respectively connected to variable capacitance diodes D6 and D7 of voltage control oscillator 233 of microwave monolithic integrated circuit 23 through capacitor C102, and connected to power supply V+through resistor R101 and capacitor C103. The internal circuit of demodulator circuit 41 is coupled to automatic gain control (AGC).

Demodulator circuit 41 which is comprised of integrated circuit IC4, capacitors C5, C8, C128 and C129, and resistor R21, . . . , demodulates the intermediate frequency signal outputted from intermediate frequency amplifier unit 3 and controls the gaining or reducing of the demodulated signal, so as to provide a satisfactory baseband frequency signal.

Baseband amplifier circuit 42 which is comprised of transistors Q201 and Q202, resistors R210, R202, R203, R204, R205 and R206, and capacitors C201 and C202, amplifies the baseband frequency signal from the demodulator circuit 41 and then sends the amplified signal to phase correction circuit 43.

Phase correction circuit 43 which is comprised of a resistor R102 and a capacitor C101 receives the output signal from baseband amplifier circuit 42 and corrects the phase of the signal, and then feedbacks the corrected signal to variable capacitance diode VC101.

Variable capacitance diode VC101 receives the corrected feedback signal from phase correction circuit 43, and is controlled by V+to change the DC level of variable capacitance diode VC101 and then to send the feedback signal to voltage control oscillator 233 of microwave monolithic integrated circuit 23 for regulating its oscillating frequency.

When the frequency of the image modulating signal of the radio frequency signal is deviated (assume the amount of deviation is $\Delta RF$) upon the loading of a load, the ideal amount of deviation of the intermediate frequency signal after mixing is $\Delta RF$, and the signal is filtrated and amplified by intermediate frequency amplifier unit 3 and demodulated by demodulator circuit 41 of negative feedback & image compression circuit 4 to provide the necessary baseband frequency signal. Under this stage, the baseband frequency signal is outputted in two ways. In one way, the image signal of the baseband frequency is provided to the subscriber. In the other way, the baseband frequency signal is amplified by the baseband amplifier circuit 42, then processed through phase correction circuit 43, variable capacitance diode VC101 and V+to correct the phase, and then the corrected signal is fed back to voltage control oscillator 233 of microwave monolithic integrated circuit 23 through capacitor C102 to modulate the oscillating frequency of voltage control oscillator 233 reversely, causing voltage control oscillator 233 to produce an amount of deviation ($\Delta LF$), and then the amount of deviation $\Delta LF$ is mixed with the radio frequency's amount of deviation $\Delta RF$, and therefore an intermediate frequency signal having a deviation difference ($\Delta IF$), i.e.:

$$\Delta IF = \Delta RF - \Delta LF$$

Therefore, the image deviation of the intermediate frequency signal can be effectively compressed to improve S/N ( sound/noise ) ratio when compressed image intermediate frequency signal is sent to demodulator circuit 41, so as to eliminates noises, lower the threshold, and improve the quality of the image.

While only one embodiment of the present invention has been shown and described, it will be understood that various modifications and changes could be made without departing from the spirit and scope of the invention.

What is claimed is:

1. A direct broadcasting satellite tuner comprising:

radio frequency input means for receiving and amplifying the radio frequency signal transmitted from a satellite antenna;

frequency converting means for converting the signal outputted from said radio frequency input means into an intermediate frequency signal by means of the operation of a microwave monolithic integrated circuit thereof, said microwave monolithic integrated circuit comprised of a radio frequency amplifier, a frequency mixer, and a voltage control oscillator;

intermediate frequency amplification means for amplifying the output intermediate frequency signal from said frequency converting means, then filtrating the amplified intermediate frequency signal by bandwidth of 16 MHz or 12 MHz, and then amplifying the filtrated signal; and negative feedback & image compression circuit means comprising of a demodulator circuit, a baseband amplifier circuit, a phase correction circuit, a variable capacitance diode, and a power supply; wherein:

said demodulator circuit receives and demodulates the output signal from said intermediate frequency amplification means so as to obtain a satisfactory baseband frequency signal by means of the control of an automatic gain control circuit;

said baseband amplifier circuit is connected to the output terminal of said demodulator circuit to receive and amplify the baseband frequency signal from said demodulator circuit;

said phase correction circuit is connected to the output terminal of said baseband amplifier circuit to receive the output signal from said demodulator circuit and then to correct the phase of the deviation of the signal;

said variable capacitance diode is connected to the output terminal of said phase correction circuit and connected respectively to the voltage control oscillator of said microwave monolithic integrated circuit and said power supply, to receive the phase corrected signal from said phase correction circuit and to regulate the DC level of the phase corrected signal by means of the control of said power supply and then to feed back the regulated signal to said voltage control oscillator for regulating the oscillating frequency, for permitting the oscillating frequency from said voltage control oscillator to be mixed with the frequency of said radio frequency signal so that the modulated intermediate frequency signal can be compressed and the compressed image intermediate frequency signal can effectively eliminate noises, increase sound/noise ratio and improve the threshold when entering said demodulator circuit.

2. The direct broadcasting satellite tuner of claim 1 wherein said radio frequency input means comprises:

a first low-pass filter to receive the radio frequency signal (950 MHZ–2500 MHZ) from said satellite antenna and to remove frequency of bandwidth over 2050 MHZ from the signal;

a first radio frequency amplifier to amplify the output signal from said first low-pass filter;

a second low-pass filter to receive the radio frequency signal (950 MHZ–2050 MHZ) from said satellite antenna and to remove frequency of bandwidth over 2050 MHZ from the signal;

a second radio frequency amplifier to amplify the output signal from said second low-pass filter; and a switching circuit controlled to let said first low-pass filter or said second low-pass filter receive the radio frequency signal from said satellite antenna.

3. The direct broadcasting satellite tuner of claim 1 wherein said frequency converting means comprises:

a tracking filter to receive the output signal from said radio frequency input means and to remove image frequency from the signal;

an attenuation circuit to receive the output signal from said tracking filter and to attenuate the signal so as to eliminate the interference of noises when the intensity of the received signal is high; and a microwave monolithic integrated circuit to receive the output signal from said attenuation circuit and to process it into an intermediate frequency signal through a superheterodyne process by means of the operations of the radio frequency amplifier and voltage control oscillator thereof.

4. The direct broadcasting satellite tuner of claim 1 wherein said intermediate frequency amplification means comprises:

a first stage intermediate frequency amplifier to receive and amplify the output intermediate frequency signal from said frequency converting means;

a SAW filter to filtrates the signal of frequency bandwidth of 16 MHZ or 12 MHZ from the amplified output intermediate frequency signal from said first stage intermediate frequency amplifier; and a set of second stage intermediate frequency amplifiers including a first second stage intermediate frequency amplifier to receive and amplify the intermediate frequency signal of bandwidth 16 MHZ from said SAW filter, and a second second stage intermediate frequency amplifier to receive and amplify the intermediate frequency signal of bandwidth 12 MHZ from said SAW filter.

5. The direct broadcasting satellite tuner of claim 3 wherein said attenuation circuit of said frequency converting means is coupled to an automatic gain control circuit to control the gaining and reducing of the output signal from said tracking filter.

6. The direct broadcasting satellite tuner of claim 4 wherein said first stage intermediate frequency amplifier of said intermediate frequency amplification means is coupled to an automatic gain control circuit to control the gaining and reducing of the intermediate frequency signal passing through.

* * * * *